March 15, 1955  R. W. WILSON  2,704,020
IMPLEMENT FRAME OVERLOAD RELEASE DEVICE
Filed May 23, 1952  2 Sheets-Sheet 1
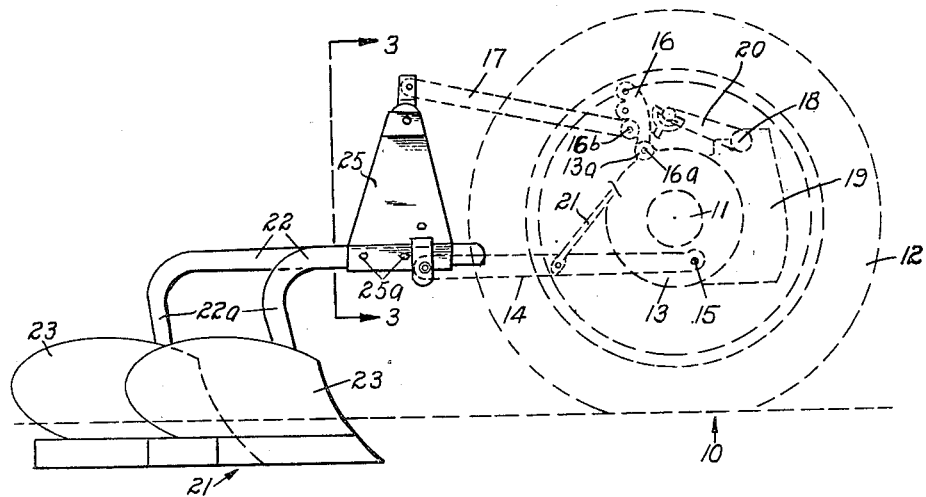
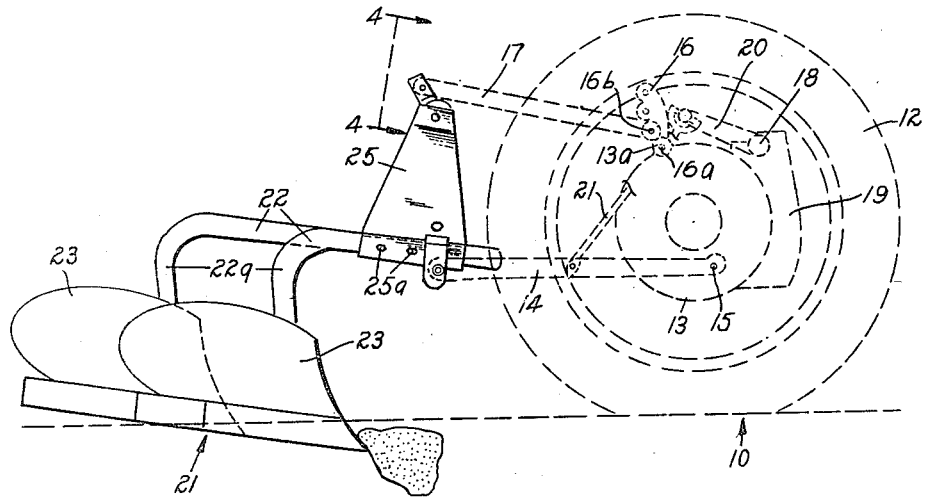
INVENTOR.
RAYMOND W. WILSON

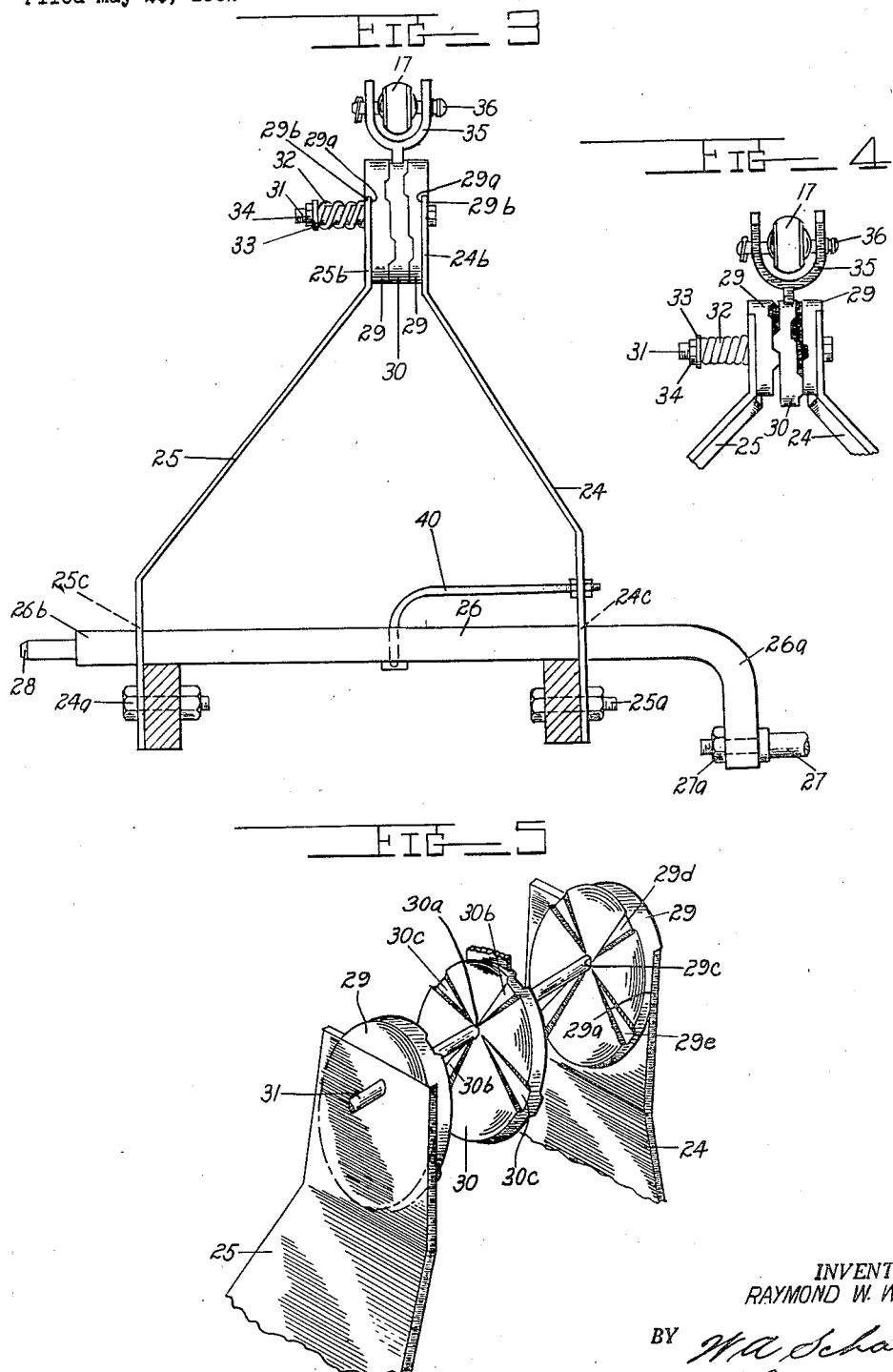

United States Patent Office 2,704,020
Patented Mar. 15, 1955

2,704,020

IMPLEMENT FRAME OVERLOAD RELEASE DEVICE

Raymond W. Wilson, Ferndale, Mich., assignor, by mesne assignments, to Ford Motor Company, Dearborn, Mich., a corporation of Delaware Application May 23, 1952, Serial No. 289,451

3 Claims. (Cl. 97—47.89)

This invention relates to a device for use with implements that are mountable on the three-point hitch linkage of tractors which permits effective shortening of the top link of such linkage for the relief of overstressed parts of the implement and the tractor.

In my copending application, Serial No. 283,299, filed April 21, 1952, entitled, Implement Frame Trip, and assigned to the assignee of this application, there is disclosed and illustrated a device which permits effective shortening of the top link of a tractor having a so-called three-point hitch linkage which permits implements mounted on such linkage to tilt forwardly to relieve overstressing of the linkage and the tractor in the event an obstruction in the soil is encountered. As described in such copending application, I relied upon elastic distortion of the implement frame to effect collapse of a toggle member to permit effective shortening of the upper link. A rocker member to which the upper link is attached moves in such a direction upon collapse of the toggle that the so-called A-frame of the implement tilts forwardly.

The instant invention contemplates accomplishing the same ends as the device in my copending application, utilizing, instead, a slip connection between the A-frame of the implement and the top link which is responsive to overload on the implement to permit effective shortening of the top link to allow the implement A-frame to tilt forwardly.

Accordingly, it is an object of this invention to provide an improved release device for the top link of a tractor having a three-point hitch linkage, to permit effective shortening of the tractor top link so that the implement may tilt in response to excessive draft forces for the prevention of overstressing of the linkage and the implement components.

Another object of this invention is to provide a slip cam connection for the top link of a tractor having a three-point hitch linkage which permits effective shortening of the top link in response to shock loads, as when an implement encounters an obstruction in the soil.

A further object of this invention is to provide a shiftable top link connection for three-point hitch implements which can be selectively operated to relieve stress on the top link when the tractor and implement are mired.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the rear end portion of a tractor having a three-point hitch linkage mounted thereon and embodying a two bottom plow mounted thereon and embodying the improved top link slip connector constructed in accordance with this invention;

Figure 2 is a view similar to Figure 1, but showing the plow frame in its tripped position;

Figure 3 is an enlarged sectional detail view taken along the plane 3—3 of Figure 1;

Figure 4 is an enlarged detail sectional view taken along the plane 4—4 of Figure 2; and Figure 5 is an enlarged detail exploded view of the slip connector illustrating in detail the configuration of the cam projections and cooperating slots.

As shown on the drawings:

In Figure 1 there is shown the rear end portion of a tractor 10 having a rear axle housing 11. Rear axle housing 11 has a pair of wheels 12 respectively journaled on its ends. A differential housing 13 is provided centrally of the axle housing 11. A pair of rearwardly extending hitch links 14 are connected at laterally spaced points 15 to the tractor rear axle housing 11. An upstanding lug 13a is provided on the upper rear portion of the differential housing 13 and a rocker member 16 is pivotally secured thereto by a pin 16a. A tractor top link 17 has its rear end pivotally connected as at 16b to the rocker member 16. A transverse rock shaft 18 is journaled in the upper portion of the center housing 19 of tractor 10 and a pair of rock arms 20 are secured to the ends of the rock shaft 18. A pair of links 21 respectively connect the ends of the rock arms 20 to the medial portions of the hitch links 14. The rock shaft 18 is rocked by a built-in hydraulic mechanism (not shown) for vertically lifting the hitch links 14. All of the above described elements are conventional parts of the well-known Ford tractor and hence further description is not believed necessary.

In Figures 1 and 2 there is shown a two bottom plow 21 mounted on the trailing hitch links 14 of tractor 10. Plow 21 comprises a pair of laterally spaced, longitudinally disposed plow beams 22. The plow beams 22 are maintained in laterally spaced relationship by the usual cross braces (not shown). On the depending rear end portions 22a of the plow beams 22, a pair of plow bottoms 23 are respectively mounted for tilling the soil. A pair of side plates 24 and 25, defining an upstanding subframe or a so-called A-frame, are respectively mounted on the forward end portions of the plow beams 22. Bolts 24a and 25a respectively secure the lower end portions of the side plates 24 and 25 to the respective plow beams 22. Each of the side plates 24 and 25 is of substantially triangularly shaped configuration and such side plates are bent to slope inwardly and upwardly as best shown in Figure 3. The upper end portions 24b and 25b of the side plates 24 and 25 are respectively bent upwardly into laterally spaced parallel relationship for a purpose to be later explained.

The lower end portions of the side plates 24 and 25 are respectively transversely apertured, as shown at 24c and 25c. The apertures 24c and 25c are disposed just above the plow beams 22 and such apertures receive a transverse cross shaft 26. The cross shaft is secured in a desired position of transverse adjustment relative to the plow beams 22 by a suitable screw adjusting device 40. The right hand end of cross shaft 26 is bent downwardly at right angles, as shown at 26a, and such downwardly bent portion has a horizontal mounting pin 27 secured within a transverse hole in such portion. A nut 27a screwed onto the threaded inwardly projecting end of the pin 27 secures such pin against displacement.

The other end 26b of cross shaft 26 has a horizontal mounting pin 28 shrunk into a suitable horizontal hole (not shown) provided in the end 26b of cross shaft 26. For a more detailed description of the plow 21, the side plates 24 and 25, and the mounting and adjustment of the cross shaft 26, reference may be had to the co-pending application of Ralph C. Frevik, Serial No. 136,885, filed January 5, 1950, entitled, Adjusting Mechanism for Implements, and assigned to the assignee of this application.

The trailing ends of the hitch links 14 have apertured spherical, universally swiveling connectors which permit mounting such trailing ends of the hitch links on the mounting pins 27 and 28 provided on the cross shaft 26. The trailing end of the tractor top link 17 is also provided with a spherical apertured connector.

The top link connecting device of this invention which permits mounting the top link to the implement A-frame, so as to permit effective shortening of the top link 17 in response to overload on the implement, comprises a pair of outer cam elements 29 and a center cam element 30. The outer cam elements 29 are of substantially oval-shaped configuration, as best shown in Figure 5, and are respectively provided with a pair of notches 29a on their outer surfaces which define shoulders 29b. The upper end portion 24b and 25b of side plates 24 and 25 respectively fit in the notches 29a with the uppermost ends thereof abutting the shoulders 29b. The outer cam elements are respectively provided with aligned transverse holes 29c eccentrically disposed therein. Each cam element 29 has a pair of raised sector-like cam projections 29d on its inside planar face, as best shown in Figure 5. The cam projections 29d are disposed in opposed relationship and have sloped sides which diverge outwardly from the hole 29c of each cam element 29. A pair of sector shaped cam recesses 29e are also provided on the inside planar face of each cam element 29 which are angularly spaced from the cam projections 29d.

The center cam element 30 is also oval-shaped and has an eccentrically disposed hole 30a. The center cam element is also respectively provided on both of its planar surfaces with cam projections 30b and cam recesses 30c which conform identically respectively with the cam recesses 29e and cam projections 29d provided on the outer cam elements 29. Such projections and recesses are also angularly spaced as the corresponding elements on the outer cam elements 29 and are so arranged that the projections 30b will fit within the recesses 29e of the outer cam elements and the projections 29d will fit within the recesses 30c of the center cam element 30.

A transverse mounting bolt 31 is provided which is inserted through the aligned holes 29c in the cam elements 29 and the upper end portions 24b and 25b of the side plates 24 and 25, as well as through the hole 30a of the center cam element 30. Thus, the center cam element 30 is sandwiched between the outer cam elements 29, as best shown in Figures 3–5. The cam projections 29d on the outer cam elements normally snugly fit within the opposed cam recesses or grooves 30c provided in the center cam element 30 while the cam projections 30 on the center cam element 30b respectively snugly fit within cam grooves 29e provided on the outer cam elements 29.

The outer cam elements 29 and inner cam element 30 are eccentrically mounted on the bolt 31 so that only a minimum portion of such elements will project above the side plates 24 and 25 when the cam elements are rotated relative to the side plates. Thus the top link will not interfere with the cam 30 when the side plates tilt forwardly, as shown in Figure 2. Bolt 31 projects a substantial distance beyond the left hand side plate 24, as best shown in Figures 3 and 4, and a helical compression spring 32 surrounds such projecting end of the bolt. One end of spring 32 abuts the outer side surface of the upper end 24b of side plate 24, while the other end of spring 32 abuts a washer 33 placed over the bolt 31. A nut 34 screwed on the threaded end of the bolt 31 adjustably compresses spring 32 to a desired tension which yieldingly maintains the several cam projections within their corresponding cam grooves of the inner and outer cam elements 29 and 30. A fork arm is secured as by welding to the top of the central cam element 30, and the arms of each fork are transversely apertured. A bolt 36 inserted through the aligned apertures in the fork 35 and through the apertured spherical connector provided in the trailing end of the top link 17 effects pivotal connection of the top link 17 thereto.

It should be mentioned here that the inherent resiliency of said plates 24 and 25 may be selected so that it will normally maintain the outer cam elements 29 in engagement with the center cam element 30. However, the adjustable spring arrangement has certain advantages when the tractor becomes mired, as set forth below.

In Figure 1, the plows are shown working at a normal depth in the ground and under normal loads. In the event a relatively immovable obstruction is encountered as the plow bottoms move through the soil, the plow will then be tilted to the position shown in Figure 2. The improved top link connection, constructed in accordance with this invention, permits tilting of the implement frame so that overstressing of the various components will be substantially reduced when the plow bottoms strike the obstruction. When an obstruction is struck by one or both of the plow bottoms, immediately the shock load is transmitted to the plow beams, the A-frame and the tractor linkage, thereby producing a much higher compressive force in top link 17. However, before the plow parts are seriously overstressed, the side plates 24 and 25 defining the A-frame, which are tending to rotate forwardly, force the outer cam elements 29 to be cammed out of engagement with the center cam element 30 and to rotate relative thereto. This action not only absorbs considerable energy and decelerates the tractor, but also provides time for the operator to declutch the tractor.

The amount of tilt of the implement frame is limited by the angular displacement of the cam projections 29d and 30b, relative to one another. Referring to Figure 4, after the outer cam elements are laterally displaced, as when such elements are cammed out of their normal engagement with the center cam element as shown in Figure 3, the spring 32 is compressed to its solid height thereby effectively limiting the lateral displacement of the side plates 24 and 25. Thus, when the cam elements 29 have been rotated until the cam projections 29d contact the cam projections 30b provided on the center cam element 30, the rotation of the outer cam elements 29 will be effectively limited because such projections cannot slip by one another due to the limited lateral displacement of the side plates 24 and 25. The amount of tilt available is preferably not sufficient to permit the plow bottoms to come entirely out of the ground.

The outer cam elements are conveniently reset to their normal position once they have been cammed out of engagement with the central cam element 30 by merely raising the plow to its full height by effecting raising of the hitch links 14, whereupon the force of gravity will cause the plow frame to rotate rearwardly and reset the slip connection.

It often happens when operating the tractor in the field with an implement mounted on the hitch links that the tractor will encounter a soft spot in the soil which mires the tractor. In an effort to remove the tractor from such soft spot by spinning the rear wheels, the tractor will frequently dig itself in deeper until the tractor is supported on the implement. In such case, the tractor top link will be placed under a substantial compressive load.

In order to remove the tractor from such a mired position, it is first generally necessary to disconnect the tractor top link to restore traction to the tractor wheels. However, due to the substantial compressive load on the tractor top link, it is virtually impossible to unfasten the tractor top link without relieving this compressive load on such link. The improved implement overload release device constructed in accordance with this invention conveniently permits releasing the compressive load on the tractor top link to facilitate its disconnection from the implement. Unloosening the nut which secures the bolt 31 to the A-frame, on which the cam elements 30 and 29 are mounted, disengages the outer cam elements 29 with the inner cam element 30 which thereby permits the inner cam element 30 to rotate rearwardly to relieve the compressive force in the tractor top link. Upon release of such force, the tractor top link can then be readily removed from the implement.

From the foregoing description, it is clearly apparent that there is here provided a device which effectively reduces damage to an implement mounted on the so-called three-point hitch linkage of a tractor, resulting from shock loads due to striking an obstruction in the soil. While the implement attached to the tractor linkage is not broken away from such linkage, the implement frame is permitted to tilt by effectively shortening the tractor top link. Such tilting occurs in response to an excessive draft loading on the implement, thereby relieving the stressed parts before serious damage will be sustained by the implement or the tractor.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced power lifted hitch links and a top link vertically spaced above the hitch links; an implement frame having a ground working tool element, means for mounting the trailing ends of the hitch links at laterally spaced points on said implement frame, a pair of upstanding side plate members mounted at laterally spaced points on said implement frame, said side plate members sloping upwardly to define an A-frame, resilient means urging the upper ends of said side plate members toward one another and accommodating only limited spreading movement of said members, a pair of first cam elements respectively mounted in opposed relationship on the upper end of said A-frame, a second cam element, bolt means for mounting said second cam element on said A-frame between said first cam elements, all of said cam elements having cooperating cam surfaces including interdigitated cam lugs and grooves, means for connecting the top link to said second cam element, said resilient means exerting a bias on said first cam elements to yieldingly maintain their cam surfaces in engagement with said cam surfaces of said second cam element, said first cam elements being cammed out of interdigitated engagement with said second cam element in response to draft overload on the ground working element, whereby the top link is effectively shortened to permit said frame to rotate relative to said second cam element, and abutment of the cam lugs of said first cam elements and said second cam element preventing further relative movement of said second element since said resilient means will not accommodate further spreading of said side plate members.

2. For use with a tractor having a pair of laterally spaced power lifted hitch links and a top link vertically spaced above the hitch links; a plow frame having a plow beam, a pair of upstanding plate members on said plow frame defining an A-frame, a cross shaft transversely slidably mounted in said side plate members, means for adjustably securing said cross shaft relative to said side plate members, means for respectively mounting the trailing ends of the hitch links on the ends of the cross shaft, an inner cam member having on each of its respective planar faces a pair of radially opposed outwardly diverging grooves, a pair of radially opposed cam lugs on each of the respective faces of said inner cam member angularly spaced from said grooves, said cam lugs having sloped edges diverging outwardly, means for connecting the trailing end of the top link to said plate member, a pair of outer cam members respectively mounted on the upper ends of said A-frame in opposed aligned relationship, bolt means axially traversing said outer cam members and said side plate members, said inner cam member being axially mounted on said bolt means between said outer cam members, said outer cam members having respectively on their inwardly disposed planar surfaces a pair of radially opposed grooves constructed and arranged to receive said cam lugs, a pair of lugs on each of said inner planar faces of said outer cam members angularly spaced from said grooves thereon and being constructed and arranged to fit within said grooves on said inner cam member, and spring means acting between said bolt means and one of said side plates to yieldingly maintain all of said lugs within their respective grooves, said lugs being cammed out of their respective grooves in response to excessive draft loads on the plow thereby permitting said A-frame to rotate about said bolt means, said lugs on said outer cam members being respectively engageable with the lugs on said inner cam member to limit the rotation of said A-frame.

3. The invention of claim 1 wherein the resilient means is a coiled compression spring which is reduced in length to its solid height when said cam lugs and grooves are moved from interdigitated engagement.

References Cited in the file of this patent

UNITED STATES PATENTS

| | | |
|---|---|---|
| 2,337,026 | Cantral | Dec. 21, 1943 |
| 2,405,980 | Sands et al. | Aug. 20, 1946 |
| 2,424,372 | Silver | July 22, 1947 |

FOREIGN PATENTS

| | | |
|---|---|---|
| 765,260 | France | Mar. 19, 1934 |